US011858208B2

(12) United States Patent
Hinch et al.

(10) Patent No.: US 11,858,208 B2
(45) Date of Patent: Jan. 2, 2024

(54) THREE-DIMENSIONAL PRINTING

(71) Applicant: Hewlett-Packard Development Company, L.P., Spring, TX (US)

(72) Inventors: Garry D. Hinch, Vancouver, WA (US); James W. Stasiak, Lebanon, OR (US); Timothy L Weber, Albany, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 471 days.

(21) Appl. No.: 16/911,137

(22) Filed: Jun. 24, 2020

(65) Prior Publication Data

US 2020/0338819 A1 Oct. 29, 2020

Related U.S. Application Data

(63) Continuation-in-part of application No. PCT/US2019/029538, filed on Apr. 27, 2019.

(51) Int. Cl.
*B33Y 70/10* (2020.01)
*C08K 3/38* (2006.01)
(Continued)

(52) U.S. Cl.
CPC .......... *B29C 64/165* (2017.08); *B22F 1/0545* (2022.01); *B22F 1/105* (2022.01); *B22F 3/1021* (2013.01); *B22F 10/14* (2021.01); *B22F 10/64* (2021.01); *B29C 64/209* (2017.08); *B29C 64/245* (2017.08); *B29C 64/295* (2017.08); *B29C 64/371* (2017.08); *B33Y 10/00* (2014.12); *B33Y 40/20* (2020.01); *B33Y 70/10* (2020.01); *C08K 3/38* (2013.01); *C08L 101/00* (2013.01); *B22F 12/13* (2021.01); *B22F 12/17* (2021.01); *B22F 12/53* (2021.01); *B22F 2301/205* (2013.01); *B22F 2301/255* (2013.01);
(Continued)

(58) Field of Classification Search
CPC ....... B29C 64/165; B33Y 10/00; B33Y 40/20; B33Y 70/10; B22F 10/14; B22F 3/1021; B22F 2301/255; B22F 2301/35; C08K 3/38; C08K 2003/385; C08L 101/00
USPC .......................................... 106/31.01, 31.13
See application file for complete search history.

(56) References Cited

FOREIGN PATENT DOCUMENTS

WO 2018/193306 A2 10/2018
WO WO-2019017926 A1 * 1/2019 .............. B22F 1/007
WO 2019/025801 A1 2/2019

OTHER PUBLICATIONS

Enrique, P. D., et al., "In situ formation of metal matrix composites using binder jet additive manufacturing (3D printing)", Materials Letters, Elsevier, Amsterdam, NL, vol. 232, Aug. 23, 2018, pp. 179-182.

(Continued)

*Primary Examiner* — James E McDonough
(74) *Attorney, Agent, or Firm* — Dierker & Kavanaugh, P.C.

(57) ABSTRACT

A hardening agent for three-dimensional printing includes a boron-containing hardener and a jettable liquid vehicle, and is devoid of a pigment and a dye. The boron-containing hardener is selected from the group consisting of a water dispersible boron-containing hardener present in an amount ranging from about 6 wt % to about 15 wt %, and a water soluble boron-containing hardener present in an amount ranging from greater than 1 wt % to about 20 wt %.

11 Claims, 5 Drawing Sheets

(51) Int. Cl.
- *C08L 101/00* (2006.01)
- *B29C 64/165* (2017.01)
- *B29C 64/295* (2017.01)
- *B29C 64/209* (2017.01)
- *B29C 64/245* (2017.01)
- *B29C 64/371* (2017.01)
- *B33Y 10/00* (2015.01)
- *B33Y 40/20* (2020.01)
- *B22F 10/14* (2021.01)
- *B22F 3/10* (2006.01)
- *B22F 10/64* (2021.01)
- *B22F 1/0545* (2022.01)
- *B22F 1/105* (2022.01)
- *B22F 12/13* (2021.01)
- *B22F 12/17* (2021.01)
- *B22F 12/53* (2021.01)

(52) U.S. Cl.
CPC ... *B22F 2301/35* (2013.01); *B29K 2995/0094* (2013.01); *C08K 2003/385* (2013.01)

(56) References Cited

OTHER PUBLICATIONS

Matuschka, A., "Boronizing," Heyden Publications, Philadelphia, PA, 1980.
Afolabi, Ayo S. et al., "Controlled Surface Treatment of Mild Steel with Carbon Nanotubes at Austenitic Temperature", WCECS 2015 vol. II, 5 pages.
Boriding—an overview | ScienceDirect Topics, 2020, 16 pages, https://www-sciencedirect-com.ezproxy-pa1.labs.hp.com/topics/engineering/boriding.
Costa, H. et al. "Some Innovative Surface Texturing Techniques for Tribological Purposes"; Jun. 19, 2014; Part J: Journal of Engineering Tribology, 86 pages.
"Boriding—Boronizing—DHB—Thermo-Chemical Surface Hardening Process", IBC Coatings Technologies, Inc., ibccoatings.com/boriding-boronizing-dhb, retrieved Jun. 29, 2020, 3 pgs.
Srivastava, V. K.; "A Review on Advances in Rapid Prototype 3D Printing of Multi-Functional Applications", Science and Technology 2017, 7(1): 4-24, 15 pgs.
Mebarek, B. et al.; "Effect of Boride Incubation Time During the Formation of Fe2B Phase" Mat. Research, 2018, 21(I), 7pgs (http://dx.doi.org/10.1590/1980-5373-MR-2017-0647).
Rabeeh, B., "Ultra-Fast Boriding and Surface Hardening of Low Carbon Steel", TMS (The Minerals, Metals, and Materials Soc.) Ann. Meeting, 2015, 1499-1506.

\* cited by examiner

THREE-DIMENSIONAL PRINTING

CROSS-REFERENCE TO RELATED APPLICATIONS

This application is a continuation-in-part of International Patent Application No. PCT/US2019/029538, filed on Apr. 27, 2019, which is incorporated by reference herein in its entirety.

BACKGROUND

Three-dimensional (3D) printing may be an additive printing process used to make three-dimensional solid objects from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
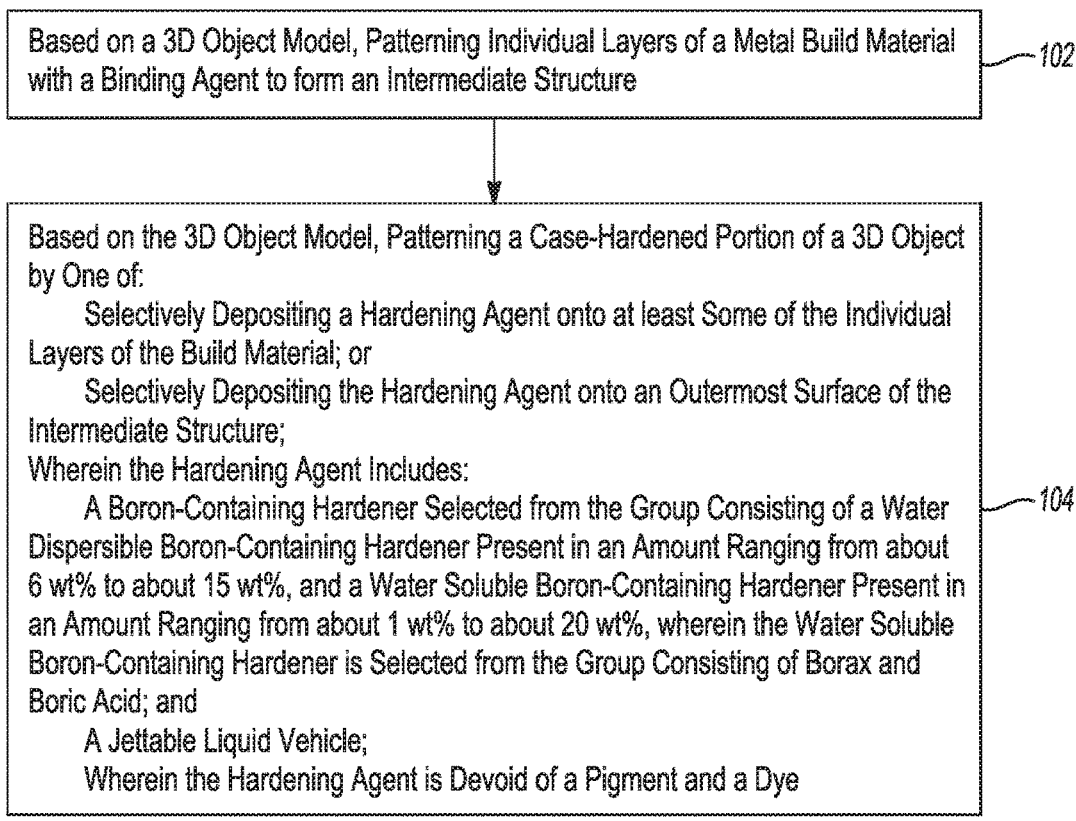
FIG. 1 is a flow diagram illustrating an example method of three-dimensional printing in accordance with the present disclosure.

In some examples of three-dimensional (3D) printing, a binder fluid is selectively applied to a layer of build material on a build platform, thereby patterning a selected region of the layer, and then another layer of the build material is applied thereon. The binder fluid is then selectively applied to this other layer, and these processes may be repeated to form a green part (referred to herein as an "intermediate structure") of a 3D part/object that is ultimately to be formed. The binder fluid may be capable of penetrating the layer of the build material onto which it is applied, and/or spreading around an exterior surface of the build material and filling void spaces between particles of the build material. The binder fluid can include binder particles, such as polymer latex particles, that when cured, temporarily hold the build material of the 3D intermediate structure together. The 3D intermediate structure may be moved from the build platform to a separate device for heating to remove the binder particles and to sinter the build material particles of the patterned intermediate structure to form the 3D part/object.

The examples disclosed herein introduce digitally-controlled boron-based hardening agents into this binder fluid based 3D printing process. Boron-containing hardening agents may be selectively applied, e.g., using an inkjet printhead, to the intermediate structure as it is being built or after it is built. Selective application of the hardening agent by digital inkjet printing methods enables the hardness to be engineered spatially and volumetrically at the voxel-scale. This enables a reinforcement structure to be strategically built into the body of the 3D object. The agents and methods disclosed herein enable predictable, systematic, and reproducible hardening of 3D printed metal objects.

The methods disclosed herein utilize inkjet compatible hardening agent(s) and binder fluid(s), as well as metal-based build materials. By "inkjet compatible," it is meant that the hardening agent or binder fluid can be ejected from a thermal inkjet printhead, a piezoelectric inkjet printhead, or both types of printheads. The printheads may be drop-on-demand inkjet printheads or continuous inkjet printheads. The agents and fluids may have a surface tension ranging from about 20 mN/m to about 40 mN/m, which are suitable for jetting. In another example, the agents and fluids may have a surface tension ranging from about 20 mN/m to about 30 mN/m.

Throughout this disclosure, a weight percentage that is referred to as "wt % active" refers to the loading of an active component of a dispersion or other formulation that is present in the hardening agent, binder fluid, and/or build material composition. For example, a boron-containing hardener, such as boron carbide nanoparticles, may be present in a water-based formulation (e.g., a stock solution or dispersion) before being incorporated into the hardening agent. In this example, the wt % actives of the boron carbide nanoparticles accounts for the loading (as a weight percent) of the boron carbide nanoparticles solids that are present in the hardening agent, and does not account for the weight of the other components (e.g., water, etc.) that are present in the stock solution or dispersion with the boron carbide nanoparticles. The term "wt %," without the term actives, refers to either i) the loading of a 100% active component that does not include other non-active components therein, or ii) the loading of a material or component that is used "as is" and thus the wt % accounts for both active and non-active components.

Hardening Agent

Examples of the hardening agent include a boron-containing hardener selected from the group consisting of a water dispersible boron-containing hardener present in an amount ranging from about 6 wt % to about 15 wt %, and a water soluble boron-containing hardener present in an amount ranging from greater than 1 wt % to about 20 wt %, and a jettable liquid vehicle, wherein the hardening agent is devoid of a pigment and a dye.

The water dispersible boron-containing hardener is selected from the group consisting of boron carbide ($CB_4$), boron nitride (BN), silicon borides, aluminum borides, alkali metal borides, alkaline earth metal borides, transition metal borides, lanthanide borides, and combinations thereof. Examples of suitable silicon borides include silicon triboride ($SiB_3$), silicon tetraboride ($SiB_4$), silicon hexaboride ($SiB_6$), or $SiB_n$, where n=14, 15, 40. Examples of suitable aluminum borides $AlB_2$ and $AlB_{12}$. Examples of suitable alkali metal and alkaline earth metal borides include $LiB_6$, $NaB_6$, $KB_6$, $MgB_2$, $MgB_4$, $CaB_4$, $CaB_6$, $SrB_6$, and $BaB_6$. Examples of transition metal and lanthanide borides include TiB, VB, CrB, MnB, FeB, CoB, NiB, $ZrB_2$, NbB, MoB, $MoB_2$, WB, $WB_2$, $LaB_4$, $LaB_6$, $NdB_4$, $NdB_6$, $SmB_4$, $SmB_6$, etc.

Any of the water dispersible boron-containing hardeners that are included may have an average particle size (e.g., mean diameter, which may be calculated using a number distribution or a volume distribution.) ranging from about 2 nm to about 100 nm. In another example, the water dispersible boron-containing hardeners may have a particle size ranging from about 10 nm to about 50 nm.

As mentioned, the water dispersible boron-containing hardeners may be present in an amount ranging from about 6 wt % to about 15 wt %, based on the total weight of the hardening agent. As other examples, the water dispersible boron-containing hardeners may be present in an amount ranging from about 7.5 wt % to about 14.5 wt %, or from about 10 wt % to about 15 wt %, or from about 7 wt % to about 9 wt %, etc., based on the total weight of the hardening agent.

When the water dispersible boron-containing hardener is used in the hardening agent, the hardening agent may also include a polymeric dispersant. Some specific examples of suitable dispersants include sodium polyacrylate, poly(ammonium acrylate-co-methyl acrylate), poly(acrylic-co-maleic) acid, poly(acrylic-co-methacrylic) acid, polyacrylamide, ammonium methacrylate, dimethylaminoethyl methacrylate, a water soluble acrylic acid polymer (e.g., CARBOSPERSE® K7028 available from Lubrizol), water soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), water soluble styrene-maleic anhydride copolymers/resins, polyurethanes, and polyurethane-based block copolymers.

Whether a single polymeric dispersant is used or a combination of dispersants is used, the total amount of dispersant(s) in the hardening agent may range from about 0.1 wt % active to about 5 wt % active based on the total weight of the hardening agent. In an example, the total amount of dispersant(s) in the hardening agent may be about 0.2 wt % active based on the total weight of the hardening agent.

The water soluble boron-containing hardener is selected from the group consisting of boric acid and a borate. Any acid containing a boron atom may be used. Examples of suitable acids include boric acid ($H_3BO_3$), metaboric acid ($HBO_2$), tetraboric acid ($H_2B_4O_7$), pentaboric acid ($HB_5O_8$), and fluoroboric acid ($HBF_4$). Any borate may also be used. Sodium tetraborate decahydrate, also known as borax, is one example of a suitable borate. Other examples of suitable borates include ammonium borate, lithium borate, hydrated lithium borate, sodium borate, hydrated sodium borate, potassium borate, hydrated potassium borate, hydrated aluminum borate, potassium metaborate, hydrated potassium metaborate, sodium metaborate, hydrated sodium metaborate, hydrated ammonium tetraborate, lithium tetraborate, hydrated lithium tetraborate, hydrated potassium tetraborate, disodium tetraborate, hydrated ammonium pentaborate, and hydrated sodium peroxoborate. Tetrafluoroborate salts have very high solubility in water and may be used in the hardening agent disclosed herein. Examples of suitable tetrafluoroborate salts include sodium tetrafluoroborate ($NaBF_4$) and sodium tetrafluoroborate ($KBF_4$). Some tetraarylborates are also water soluble, and may be used in the hardening agent disclosed herein. Examples of suitable tetraarylborates include lithium tetraphenylborate ($LiB(C_6H_5)_4$) and sodium tetraphenylborate ($NaB(C_6H_5)_4$).

As mentioned, the water soluble boron-containing hardeners may be present in an amount ranging from greater than 1 wt % to about 50 wt %, based on the total weight of the hardening agent. The amount included may depend upon the water solubility of the given hardener. The water soluble boron-containing hardeners that have a lower solubility (e.g., up to 10 g/100 mL, or 10% soluble) may be used in lower amounts within the given range, e.g., from greater than 1 wt % to about 10 wt %. As examples, water soluble boron-containing hardeners having water solubility ranging from about 2 g/100 mL to about 6 g/100 mL may be used in amounts ranging from greater than 1 wt % to about 6 wt %. The water soluble boron-containing hardeners that have a higher solubility (e.g., greater than 10 g/100 mL, or 10% soluble) may be used in higher amounts within the given range, e.g., from 6 wt % to about 50 wt %. As examples, water soluble boron-containing hardeners having water solubility ranging from about 75 g/100 mL to about 120 g/100 mL may be used in amounts ranging from about 12 wt % to about 20 wt %.

The relatively high amounts of the water dispersible boron-containing hardeners do not deleteriously affect the jettability of the hardening agent. This may be due, in part, to the fact that the hardening agent is devoid of a pigment and a dye. "Devoid of," as used herein, means that no pigment or dye is present in the hardening agent.

The hardening agent also includes a jettable liquid vehicle. By "liquid vehicle," it is meant that the liquid(s) into which the boron-containing hardener is introduced. By "jettable," it is meant that that the hardening agent is dispensable from an inkjet printhead.

In the examples disclosed herein, the jettable liquid vehicle includes water, a co-solvent, and an additive selected from the group consisting of a surfactant, and combinations thereof. In some examples, the vehicle of the hardening agent consists of a co-solvent and/or a surfactant, and a balance of water. In other examples, other additives may also be included, such as anti-microbial agent(s), chelating agent(s), and/or combinations thereof.

The vehicle includes at least some water (e.g., deionized water, purified water). The amount of water may depend, in part, on the type of jetting architecture that is to be used. For example, if the hardening agent is to be jettable via thermal inkjet printing, water may make up 35 wt % or more of the hardening agent. In one example, water makes up from about 70 wt % to about 75 wt % of the total weight of the hardening agent. For another example, if the hardening agent is to be jettable via piezoelectric inkjet printing, water may make up from about 25 wt % to about 30 wt % of the hardening agent, and 35 wt % or more of the hardening agent may be an organic co-solvent, such as ethanol, isopropanol, acetone, etc.

Classes of organic co-solvents that may be used in the hardening agent include aliphatic alcohols, aromatic alcohols, diols, triols or other polyols, glycol ethers, polyglycol ethers, lactams, formamides, acetamides, glycols, and long chain alcohols. Some of the co-solvents may also function as a humectant. Examples of suitable co-solvents include primary aliphatic alcohols, secondary aliphatic alcohols, 1,2-alcohols (e.g., 1,2-butanediol), 1,3-alcohols, 1,5-alcohols, 1,6-hexanediol or other diols (e.g., 1,5-pentanediol, 2-methyl-1,3-propanediol, 2-ethyl-2-(hydroxymethyl)-1,3-propanediol, etc.), glycerol, ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, 2-pyrrolidone, 1-methyl-2-pyrrolidone, N-(2-hydroxyethyl)-2-pyrrolidone, both substituted and unsubstituted formamides, both substituted and unsubstituted acetamides, and ethoxylated glycerin, which has the following formula:

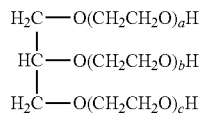

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals). Any combination of the listed co-solvents may also be used.

The co-solvent(s) may be present in the hardening agent in a total amount ranging from about 1 wt % to about 50 wt % based upon the total weight of the hardening agent, depending upon the jetting architecture of the applicator. In an example, the total amount of the co-solvent(s) present in the hardening agent ranges from about 15 wt % to about 25 wt % based on the total weight of the hardening agent.

In some examples, the vehicle of the hardening agent includes surfactant(s) to improve the jettability of the hardening agent. Examples of suitable surfactants include a self-emulsifiable, non-ionic wetting agent based on acetylenic diol chemistry (e.g., SURFYNOL® SEF from Evonik Degussa), a non-ionic fluorosurfactant (e.g., CAPSTONE® fluorosurfactants, such as CAPSTONE® FS-35, from Chemours), and combinations thereof. In other examples, the surfactant is an ethoxylated low-foam wetting agent (e.g., SURFYNOL® 440 or SURFYNOL® CT-111 from Evonik Degussa) or an ethoxylated wetting agent and molecular defoamer (e.g., SURFYNOL® 420 from Evonik Degussa). Still other suitable surfactants include non-ionic wetting agents and molecular defoamers (e.g., SURFYNOL® 104E from Evonik Degussa) or water soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TECO® Wet 510 (polyether siloxane) available from Evonik Degussa). Yet another suitable surfactant includes alkyldiphenyloxide disulfonate (e.g., the DOWFAX™ series, such a 2A1, 3B2, 8390, C6L, C10L, and 30599, from The Dow Chemical Company).

Whether a single surfactant is used or a combination of surfactants is used, the total amount of surfactant(s) in the hardening agent may range from about 0.01 wt % active to about 1 wt % active based on the total weight of the hardening agent. In an example, the total amount of surfactant(s) in the hardening agent may range from about 0.4 wt % to about 0.75 wt % active based on the total weight of the hardening agent.

In some examples, the vehicle of the hardening agent includes an anti-microbial agent. Suitable anti-microbial agents include biocides and fungicides. Example anti-microbial agents may include the NUOSEPT™ (Troy Corp.), UCARCIDE™ (Dow Chemical Co.), ACTICIDE® B20 (Thor), ACTICIDE® M20 (Thor), and combinations thereof. Other examples include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.).

The anti-microbial agent(s) may be added in any amount ranging from about 0.01 wt % active to about 0.05 wt % active, based on the total weight of the hardening agent.

In some examples, the vehicle of the hardening agent includes a chelating agent. Chelating agents (or sequestering agents) may be included in the vehicle of the hardening agent to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the hardening agent may range from greater than 0 wt % active to about 1 wt % active based on the total weight of the hardening agent. In an example, the chelating agent(s) is/are present in the hardening agent in an amount of about 0.08 wt % active (based on the total weight of the hardening agent).

Binder Fluid

The binder fluid is a fluid that includes water and polymer particles that are effective for binding layers of particulate build material when forming a 3D intermediate structure.

In some examples, the polymer particles are latex particles. Latex particles refer to any polymer (homopolymer, co-polymer, or heteropolymer) that is capable of being dispersed in an aqueous medium.

The polymer (latex) particles may have several different morphologies. In one example, the polymer particles can include two different copolymer compositions, which may be fully separated core-shell polymers, partially occluded mixtures, or intimately comingled as a polymer solution. In another example, the polymer particles can be individual spherical particles containing polymer compositions of hydrophilic (hard) component(s) and/or hydrophobic (soft) component(s) that can be interdispersed. In one example, the interdispersion can be according to IPN (interpenetrating networks) although it is contemplated that the hydrophilic and hydrophobic components may be interdispersed in other ways. In yet another example, the polymer particles can be composed of a hydrophobic core surrounded by a continuous or discontinuous hydrophilic shell. For example, the particle morphology can resemble a raspberry, in which a hydrophobic core can be surrounded by several smaller hydrophilic particles that can be attached to the core. In yet another example, the polymer particles can include 2, 3, or 4 or more relatively large polymer particles that can be attached to one another or can surround a smaller polymer core. In a further example, the polymer particles can have a single phase morphology that can be partially occluded, can be multiple-lobed, or can include any combination of any of the morphologies disclosed herein.

In some examples, the polymer particles can be homopolymers. In other examples, the polymer particles can be heteropolymers or copolymers. In an example, a heteropolymer can include a hydrophobic component and a hydrophilic component. In this example, the heteropolymer can include a hydrophobic component that can include from about 65% to about 99.9% (by weight of the heteropolymer), and a hydrophilic component that can include from about 0.1% to about 35% (by weight of the heteropolymer). In one example, the hydrophobic component can have a lower glass transition temperature than the hydrophilic component.

Examples of monomers that may be used to form the hydrophobic component of the heteropolymer polymer (latex) particles include C4 to C8 alkyl acrylates or methacrylates, styrene, substituted methyl styrenes, polyol acrylates or methacrylates, vinyl monomers, vinyl esters, ethylene, maleate esters, fumarate esters, itaconate esters, or the like. Some specific example monomers can include, C1 to C20 linear or branched alkyl (meth)acrylate, alicyclic (meth) acrylate, alkyl acrylate, styrene, methyl styrene, polyol (meth)acrylate, hydroxyethyl (meth)acrylate, or a combination thereof. In one specific class of examples, the polymer (latex) particles can be a styrene (meth)acrylate copolymer. In still another example, the polymer (latex) particles can include a copolymer with copolymerized methyl methacrylate being present at about 50 wt % or greater, or copolymerized styrene being present at about 50 wt % or greater. Both can be present, with one or the other at about 50 wt % or greater in a more specific example.

The term "(meth)acrylate" or "(meth)acrylic acid" or the like refers to monomers, copolymerized monomers, etc., that can either be acrylate or methacrylate (or a combination of both), or acrylic acid or methacrylic acid (or a combination of both). In some examples, the terms "(meth)acrylate" and "(meth)acrylic acid" can be used interchangeably, as acrylates and methacrylates are salts and esters of acrylic acid and methacrylic acid, respectively. Furthermore, mention of one compound over another can be a function of pH. Furthermore, even if the monomer used to form the polymer was in the form of a (meth)acrylic acid during preparation, pH modifications during preparation or subsequently when added to an ejectable fluid, such as a binder fluid, can impact the nature of the moiety as well (acid form vs. salt or ester form). Thus, a monomer or a moiety of a polymer described as (meth)acrylic acid or as (meth)acrylate should not be read so rigidly as to not consider relative pH levels, ester chemistry, and other general organic chemistry concepts.

In still other examples, the polymer (latex) particles in the binder fluid include polymerized monomers of vinyl chloride, vinylidene chloride, vinylbenzyl chloride, vinyl ester, styrene, ethylene, maleate esters, fumarate esters, itaconate esters, α-methyl styrene, p-methyl styrene, methyl methacrylate, hexyl acrylate, hexyl methacrylate, hydroxyethyl acrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, 2-phenoxyethyl methacrylate, isobornyl acrylate, tetrahydrofurfuryl acrylate, benzyl methacrylate, benzyl acrylate, ethoxylated nonyl phenol methacrylate, isobornyl methacrylate, ethylene glycol dimethacrylate, diethylene glycol dimethacrylate, triethylene glycol dimethacrylate, cyclohexyl methacrylate, trimethyl cyclohexyl methacrylate, t-butyl methacrylate, n-octyl methacrylate, lauryl acrylate, lauryl methacrylate, trydecyl methacrylate, alkoxylated tetrahydrofurfuryl acrylate, isodecyl acrylate, dimethyl maleate, dioctyl maleate, acetoacetoxyethyl methacrylate, diacetone acrylamide, N-vinyl imidazole, N-vinylcarbazole, N-Vinylcaprolactam, pentaerythritol tri-acrylate, pentaerythritol tetra-acrylate, pentaerythritol tri-methacrylate, pentaerythritol tetra-methacrylate, glycidol acrylate, glycidol methacrylate, tetrahydrofuryl acrylate, tetrahydrofuryl methacrylate, diacetone acrylamide, t-butyl acrylamide, divinylbenzene, 1,3-butadiene, acrylonitrile, methacrylonitrile, combinations thereof, derivatives thereof, or mixtures thereof. These monomers include low glass transition temperature (Tg) monomers that can be used to form the hydrophobic component of a heteropolymer.

In some examples, a composition of the polymer (latex) particles can include acidic monomer(s). In some examples, the acidic monomer content can range from 0.1 wt % to 5 wt %, from 0.5 wt % to 4 wt %, or from 1 wt % to 2.5 wt % of the polymer particles with the remainder of the polymer particle being composed of non-acidic monomers. Example acidic monomers can include acrylic acid, methacrylic acid, ethacrylic acid, dimethylacrylic acid, maleic anhydride, maleic acid, vinylsulfonate, cyanoacrylic acid, vinylacetic acid, allylacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof. These acidic monomers are higher Tg hydrophilic monomers, than the low Tg monomers above, and can be used to form the hydrophilic component of a heteropolymer. Other examples of high Tg hydrophilic monomers can include acrylamide, methacrylamide, monohydroxylated monomers, monoethoxylated monomers, polyhydroxylated monomers, or polyethoxylated monomers.

In an example, the selected monomer(s) can be polymerized to form a polymer, heteropolymer, or copolymer with a co-polymerizable dispersing agent. The co-polymerizable dispersing agent can be a polyoxyethylene compound, such as a HITENOL® compound (Montello Inc.) e.g., polyoxyethylene alkylphenyl ether ammonium sulfate, sodium polyoxyethylene alkylether sulfuric ester, polyoxyethylene styrenated phenyl ether ammonium sulfate, or mixtures thereof.

Any suitable polymerization process can be used to form the polymer particles. In some examples, an aqueous dispersion of latex particles can be produced by emulsion polymerization or co-polymerization of any of the above monomers.

In one example, the polymer (latex) particles can be prepared by polymerizing high Tg hydrophilic monomers to form the high Tg hydrophilic component and attaching the high Tg hydrophilic component onto the surface of the low Tg hydrophobic component. In another example, the polymer (latex) particles can be prepared by polymerizing the low Tg hydrophobic monomers and the high Tg hydrophilic monomers at a ratio of the low Tg hydrophobic monomers to the high Tg hydrophilic monomers that ranges from 5:95 to 30:70. In this example, the low Tg hydrophobic monomers can dissolve in the high Tg hydrophilic monomers. In yet another example, the polymer (latex) particles can be prepared by polymerizing the low Tg hydrophobic monomers, then adding the high Tg hydrophilic monomers. In this example, the polymerization process can cause a higher concentration of the high Tg hydrophilic monomers to polymerize at or near the surface of the low Tg hydrophobic component. In still another example, the polymer (latex) particles can be prepared by copolymerizing the low Tg hydrophobic monomers and the high Tg hydrophilic monomers, then adding additional high Tg hydrophilic monomers. In this example, the copolymerization process can cause a higher concentration of the high Tg hydrophilic monomers to copolymerize at or near the surface of the low Tg hydrophobic component.

Other suitable techniques, specifically for generating a core-shell structure, can include grafting a hydrophilic shell onto the surface of a hydrophobic core, copolymerizing hydrophobic and hydrophilic monomers using ratios that lead to a more hydrophilic shell, adding hydrophilic monomer (or excess hydrophilic monomer) toward the end of the copolymerization process so there is a higher concentration of hydrophilic monomer copolymerized at or near the surface, or any other method can be used to generate a more hydrophilic shell relative to the core.

In one specific example, the low Tg hydrophobic monomers can be selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and the high Tg hydrophilic monomers can be selected from acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof. The resulting polymer latex particles can exhibit a core-shell structure, a mixed or intermingled polymeric structure, or some other morphology.

In some examples, the polymer (latex) polymer can have a weight average molecular weight (Mw, g/mol) that can range from about 5,000 Mw to about 2,000,000 Mw. In yet other examples, the weight average molecular weight can range from about 100,000 Mw to about 1,000,000 Mw, from about 100,000 Mw to about 500,000 Mw, from about 150,000 Mw to about 300,000 Mw, or from about 50,000 Mw to about 250,000 Mw. Weight average molecular weight (Mw) can be measured by Gel Permeation Chromatography with polystyrene standard.

In some examples, the polymer (latex) particles can be latent and can be activated by heat (which may be applied iteratively during 3D intermediate structure formation or after 3D intermediate structure formation). In these instances, the activation temperature can correspond to the minimum film formation temperature (MFFT) or a glass transition temperature ($T_g$) which can be greater than ambient temperature. As mentioned herein, "ambient temperature" may refer to room temperature (e.g., ranging about 18° C. to about 22° C.). In one example, the polymer (latex) particles can have a MFFT or $T_g$ that can be at least about 15° C. greater than ambient temperature. In another example, the MFFT or the $T_g$ of the bulk material (e.g., the more hydrophobic portion) of the polymer (latex) particles can range from about 25° C. to about 200° C. In another example, the polymer (latex) particles can have a MFFT or $T_g$ ranging from about 40° C. to about 120° C. In yet another example, the polymer (latex) particles can have a MFFT or $T_g$ ranging from about 0° C. to about 150° C. In a further example, the polymer latex particles can have a $T_g$ that can range from about −20° C. to about 130° C., or in another example from about 60° C. to about 105° C. At a temperature above the MFFT or the $T_g$ of a latent latex polymer particle, the polymer particles can coalesce and can bind materials, such as the metal-based build material particles.

The polymer (latex) particles can have a particle size that can be jetted via thermal ejection or printing, piezoelectric ejection or printing, drop-on-demand ejection or printing, continuous ejection or printing, etc. In an example, the particle size (volume-weight mean diameter) of the polymer (latex) particles can range from about 1 nm to about 400 nm. In yet other examples, a particle size of the polymer particles can range from about 10 nm to about 300 nm, from about 50 nm to about 250 nm, from about 100 nm to about 250 nm, or from about 25 nm to about 250 nm. In some examples, the polymer particles can have a particle size that can be jetted via thermal ejection or printing, piezoelectric ejection or printing, drop-on-demand ejection or printing, continuous ejection or printing, etc. In these examples, the particle size of the polymer particles be about 100 nm or more.

In some examples, the polymer (latex) particles have a glass transition temperature higher than 60° C. and an average particle size of 1 nm or more.

In examples of the binder fluid, the polymer particles can be present, based on a total weight of the binder fluid, in an amount ranging from about 1 wt % active to about 40 wt % active. In other more detailed examples, the polymer particles can be present in an amount ranging from about 5 wt % active to about 30 wt % active, from about 12 wt % active to about 22 wt % active, from about 15 wt % active to about 20 wt % active, from about 10 wt % active to about 20 wt % active, or from about 6 wt % active to about 18 wt % active, based on the total weight of the binder fluid.

In addition to the polymer particles, the binder fluid includes a binder fluid vehicle. In one example, the binder fluid vehicle is water. In another example, the binder fluid vehicle includes water, co-solvent(s), and one or more additives, such as surfactant(s) and/or dispersing agent(s), anti-microbial agent(s), viscosity modifier(s), pH adjuster(s), chelating agent(s), and the like.

In one example, water can be present at from about 30 wt % to 100 wt % of the binder fluid vehicle component—excluding polymer particles—based on a total weight of the vehicle. Put another way, the water can be present at from about 60 wt % to about 99 wt %, from about 65 wt % to 90 wt %, or from about 70 wt % to about 85 wt %, based on a total weight of the binder fluid.

The co-solvent can be present in the binder fluid in an amount ranging from about 0.5 wt % to about 50 wt %, based on a total weight of the binder fluid. Any of the co-solvents described for the hardening agent may be used in the binder agent. Some specific examples include propyleneglycol ether, dipropyleneglycol monomethyl ether, dipropyleneglycol monopropyl ether, dipropyleneglycol monobutyl ether, tripropyleneglycol monomethyl ether, tripropyleneglycol monobutyl ether, dipropyleneglycol monophenyl ether, 2-pyrrolidone, 2-methyl-1,3-propanediol (MP-diol), and combinations thereof. In some examples, the binder fluid co-solvent can be a high boiling point solvent, which can have a boiling point of at least about 110° C.

Any examples of the surfactant and/or dispersant set forth herein for the hardening agent may be used in the binder fluid.

The surfactant or combinations of surfactants can be present in the binder fluid in an amount ranging from about 0.1 wt % active to about 5 wt % active in its respective fluid based on the total weight, and in some examples, can be present at from about 0.5 wt % active to about 2 wt % active. The dispersant or combinations of dispersants can be present in the binder fluid in an amount ranging from about 0.1 wt % active to about 5 wt % active in its respective fluid based on the total weight, and in some examples, can be present at from about 0.5 wt % active to about 2 wt % active.

With respect to anti-microbial agents, any compound set forth for the hardening agent can be included in the binder fluid. In an example, the anti-microbial agent may be present in an amount ranging from about 0.0001 wt % active to about 1 wt % active.

With respect to chelating agents, any compound set forth for the hardening agent can be included in the binder fluid. In an example, the example binder fluids may include a total amount of chelating agent that ranges from greater than 0 wt % to about 2 wt % active.

Viscosity modifiers and buffers may also be present, as well as other additives to modify properties of the binder fluid.

In some examples, the binder fluid can also include from about 0.1 wt % to about 1 wt % of an anti-kogation agent, based on a total weight of the binder fluid. Kogation refers to the deposit of dried solids on a thermal inkjet printhead. An anti-kogation agent can be included to prevent the buildup of dried solids on the printhead. Examples of suitable anti-kogation agents can include oleth-3-phosphate (commercially available as CRODAFOS™ O3A or CRODAFOS™ N-3 acid), dextran 500 k, CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc.

Combined Hardening Agent and Binder Agent

The examples disclosed herein describe a hardening agent and a separate binder agent. Separate agents allow for the patterning of the 3D object (with the binder agent) and the patterning for the case-hardened portions of the 3D object to be separately controlled. However, it is to be understood that the boron-containing hardener (of the hardening agent) and the polymer particles (of the binder agent) may be combined into a single hardening/binder agent. The combined hardening/binder agent may include the boron-containing hardener, the polymer particles, and any example of the vehicle described herein for the hardening agent and/or the binder agent. This combined hardening/binder agent may be useful, for example, when it is desirable to case-harden throughout the 3D object, as described in reference to FIGS. 3A and 3B. This combined hardening/binder agent may also be used with a separate binder agent. For example, the separate binder agent may be used to pattern portion(s) of the 3D object that are not to be case-hardened, and the combined hardening/binder agent may be used to pattern portion(s) of the 3D object that are to be case-hardened.

Metal-Based Build Materials

In the examples disclosed herein, the build material can include any metal build material. The phrase "metal build material" refers to particles of a metal or a metal alloy.

In an example, the metal particles are a single phase metallic material composed of one element. In this example, the sintering temperature may be below the melting point of the single element. An example of these metal particles includes titanium. In another example, the metal particles are composed of two or more elements, which may be in the form of a single phase metallic alloy or a multiple phase metallic alloy. In these other examples, sintering generally occurs over a range of temperatures. Examples of these metal particles include low- to medium-carbon stainless steels, ferrous alloys, nickel alloys, cobalt alloys, or titanium alloys. In low-carbon stainless steel, the carbon level is 0.3% or less. In medium-carbon stainless steel, the carbon level ranges from about 0.31% to about 0.6%. Specific alloy examples can include stainless steel 304/304L (low-carbon), stainless steel GP1 (low-carbon), stainless steel 17-4PH (low-carbon), stainless steel 316/316L (low-carbon), stainless steel 430L (low carbon), titanium 6Al4V, titanium 6Al-4V ELI7, and cobalt-chromium super alloys, such as stellite. While several example alloys have been provided, it is to be understood that other alloys may be used.

The temperature(s) at which the metal particles sinter together is/are above the temperature of the environment in which the patterning portion of the 3D printing method is performed, e.g., patterning at from about 18° C. to about 100° C. In an example, sintering (which may include debinding and sintering) takes place at a temperature ranging from about 500° C. to about 3,500° C. In some examples, the metal particles may have a melting point ranging from about 500° C. to about 3,500° C. In other examples, the metal particles may be an alloy having a range of melting points.

The particle size of the metal-based build material can be similarly sized or differently sized. In one example, the D50 particle size of the metal-based build material can range from 0.5 μm to 200 μm. In some examples, the particles can have a D50 particle size distribution value that can range from about 2 μm to about 150 μm, from about 1 μm to about 100 μm, from about 1 μm to about 50 μm, etc. Individual particle sizes can be outside of these ranges, as the "D50 particle size" is defined as the particle size at which about half of the particles are larger than the D50 particle size and about half of the other particles are smaller than the D50 particle size. The particle size may be a volume-weighted mean diameter.

The shape of the particles of the particulate build material can be spherical, non-spherical, random shapes, or a combination thereof.

The metal-based build material may be used alone in a build material composition, or may be used with other additives. Any of the metal-based build material compositions disclosed herein include from about 80 wt % to 100 wt % of the metal-based build material particles (based on the total weight of the composition). In other examples, the metal-based build material particles can be present in the composition in amounts ranging from about 90 wt % to 100 wt %, or from about 95 wt % to 100 wt %, or in an amount of 100 wt %. When the metal particles are present in the build material composition in an amount less than 100 wt %, the remainder of the build material composition may be made up of additives, such as flow aids (e.g., in amounts ranging from about 0.05 wt % to about 0.2 wt %), polymer powder material, etc.

Multi-Fluid Kits and 3D Printing Kits

The hardening agent and the binder fluid may be part of a multi-fluid kit for three-dimensional printing. In an example, the multi-fluid kit includes a binder agent, and a hardening agent, which includes a boron-containing hardener selected from the group consisting of a water dispersible boron-containing hardener present in an amount ranging from about 6 wt % to about 15 wt %, and a water soluble boron-containing hardener present in an amount ranging from about 1 wt % to about 20 wt % and a jettable liquid vehicle, wherein the hardening agent is devoid of a pigment and a dye.

The hardening agent, the binder fluid, and the metal-based build material may be part of a three-dimensional printing kit.

Three Dimensional Printing Methods

In the 3D printing methods disclosed herein, the binder fluid is used to pattern an intermediate structure, and then high temperature heating is used to remove the polymer particles from the structure and sinter the metal-based build material together to form the 3D object. Also in the 3D printing methods disclosed herein, the hardening agent is used to case-harden desirable regions of the 3D object.

FIG. 1 is a flow diagram illustrating examples of the method 100. Generally, the method 100 includes: based on a 3D object model, patterning individual layers of a metal build material with a binding agent to form an intermediate structure (reference numeral 102); and based on the 3D object model, patterning a case-hardened portion of a 3D object by one of: selectively depositing a hardening agent onto at least some of the individual layers of the metal build material; or selectively depositing the hardening agent onto an outermost surface of the intermediate structure; wherein the hardening agent includes: a boron-containing hardener selected from the group consisting of a water dispersible boron-containing hardener present in an amount ranging from about 6 wt % to about 15 wt %, and a water soluble boron-containing hardener present in an amount ranging from about 1 wt % to about 20 wt %, wherein the water soluble boron-containing hardener is selected from the group consisting of borax and boric acid, and a jettable liquid vehicle and wherein the hardening agent is devoid of a pigment and a dye.

FIG. 2A through 2D illustrate an example of the 3D printing method 100 where the hardening agent 10 (FIG. 2B) is applied after the intermediate structure 12 (FIG. 2B) is patterned and cured.

Figure 2A:
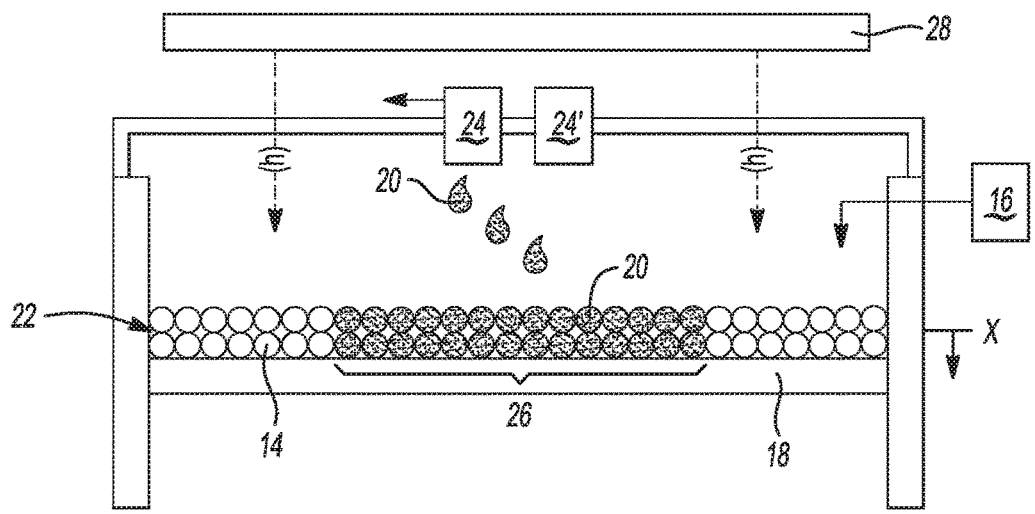
FIGS. 2A through 2D graphically illustrate one example of the method of FIG. 1.

As shown in FIG. 2A, the metal (e.g., stainless steel) build material 14 is deposited from a build material source 16 onto a build platform 18 where it can be flattened or smoothed, such as by a mechanical roller or other flattening mechanism or technique.

In this example, the binder fluid 20 can be ejected onto the metal build material 14 in a particular layer 22 from a fluid ejector 24 (such as a thermal inkjet printhead or a piezoelectric inkjet printhead). The fluid ejector 24 allows for (spatially) selective patterning of the metal build material 14 layer-by-layer. The location(s) of the selectively applied binder fluid 20 can be selected to correspond with a layer of a 3D printed object, such as from a 3D object model or computer model. The patterned portion(s) of the layer 22 of the metal build material 14 are shown at reference numeral 26. The binder fluid 20 can be applied in a single pass or over multiple passes.

The metal build material layer 22 may be heated. Heat (h), such as from a heat source 28, may be used to remove water from the binder fluid 20 throughout the patterning process. This heating temperature is 120° C. or less. In an example, this temperature may range from about 50° C. to about 100° C. In one example, heat (h) can be applied from overhead, e.g., prior to application of the next layer of metal build material 14, or after multiple layers are patterned. In another example, heat (h) can be provided by the build platform 18 from beneath the metal build material 14. In still another example, heat (h) can be applied from the build material source 16 (which preheats the metal build material 14) prior to dispensing it on the build platform 18 or a previously applied and patterned layer. Any of these heating methods may be used in combination.

After each individual layer 22 is patterned with binder fluid 20, the build platform 18 can be dropped a distance of (x), which can correspond to at least the thickness of a patterned layer in one example, so that another layer of the metal build material 14 can be added thereon and patterned with the binder fluid 20. The process can be repeated on a layer-by-layer basis until all of the desired layers are patterned in accordance with a 3D object model to form the intermediate structure 12, as shown in FIG. 2B.

The ejector(s) 24 deposit the binder fluid 20 in a pattern that corresponds to the layers of the 3D object, and the resulting intermediate structure 12 can be in any orientation. For example, the intermediate structure 12 can be printed from bottom to top, top to bottom, on its side, at an angle, or any other orientation. The orientation of the intermediate structure 12 can also be formed in any orientation relative to the layering of the metal build material 14. For example, the intermediate structure 12 can be formed in an inverted orientation or on its side relative to the build layering within the metal build material 14. The orientation of the build within the metal build material 14 can be selected in advance or even by the user at the time of printing, for example.

After all of the desired regions of the layers 22 of metal build material 14 are patterned with the binder fluid 20 to define the intermediate structure 12, heating all of the individually patterned layers may be performed. This heating is performed at a temperature ranging from about 120° C. to about 200° C. At this temperature range, heating coalesces the (latex) polymer particles from the binder fluid 20 in the patterned portion(s) 26 to form a strong polymer film throughout the intermediate structure 12. This cures the 3D intermediate structure 12, and any non-patterned metal build material 14 surrounding the 3D intermediate structure 12 remains non-cured.

Figure 2B:
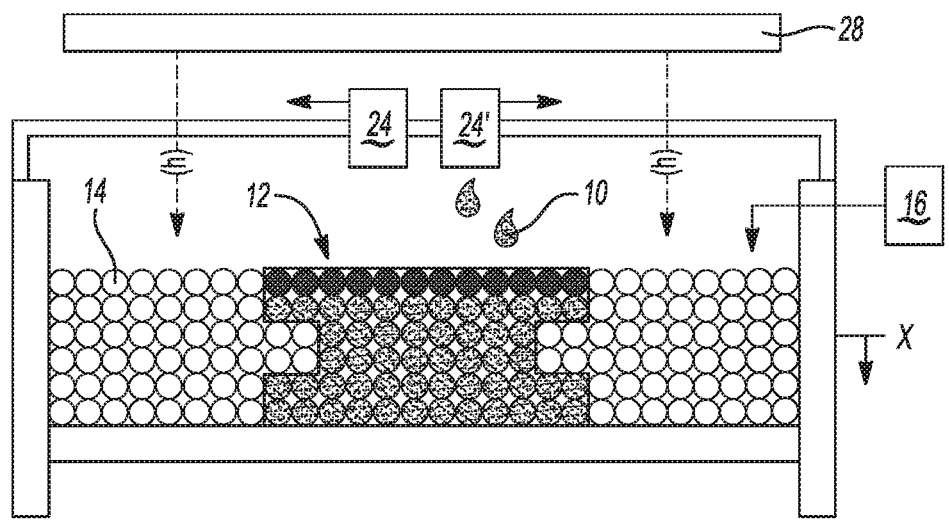

In this example of the method 100 (as shown in FIG. 2B), the hardening agent 10 is selectively deposited onto an outermost surface of the intermediate structure 12. This example of the method 100 may be desirable for case-hardening at the surface of the 3D object that is ultimately formed.

When the hardening agent 10 is applied, it may be desirable for the intermediate structure 12 to be at a temperature that allows the vehicle of the hardening agent 10 to evaporate in a controlled manner without evaporating or decomposing the boron-containing hardener. Otherwise, the cured polymer binder particles may dissolve or the hardening agent 10 may penetrate too deeply into the intermediate structure.

The hardening agent 10 can be ejected onto the surface of the intermediate structure 12 (e.g., the outermost layer of patterned and cured build material) in a particular pattern from a fluid ejector 24' (e.g., thermal inkjet ejector, piezoelectric ejector). The fluid ejector 24' enables the hardening agent 10 to be applied to a specific surface location.

The hardening agent 10 can be applied in a single pass or over multiple passes, which delivers some or all of the desired concentration of the boron-containing hardener to the intermediate structure 12. In addition to the number of print passes, other parameters, such as percentage of firing print nozzles, drop weight produced by the printhead, the percent solids of the boron-containing hardener in the hardening agent 10, may affect the concentration of the boron-containing hardener that is delivered. Any of these parameters may be adjusted or accounted for to deliver a specific boron-containing hardener concentration per unit volume of the metal build material 14.

The intermediate structure 12 is more porous than the final 3D object 30 (FIG. 2D), and thus the droplets of the hardening agent 10 are able to better infiltrate into the porous matrix of the intermediate structure 12. The boron-containing hardener becomes trapped in the voids and interstices of the metal build material 14 as/after the hardening agent vehicle evaporates. The boron-containing hardener may diffuse further during sintering.

The cured 3D intermediate structure 12, with the hardening agent 10 applied to the surface thereof, may then be exposed to an extraction process to remove non-patterned metal build material 14.

Figure 2C:
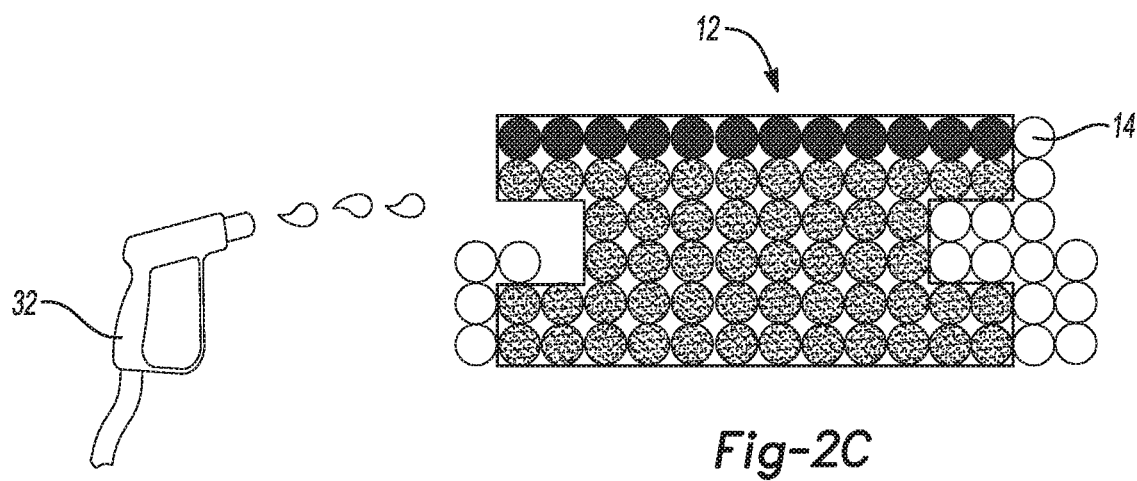

An example of the wet extraction process is shown in FIG. 2C. As shown in FIG. 2C, the non-patterned portions of the metal build material 14 (e.g., the stainless steel particles not bound by the cured polymer binder particles) may be removed from the intermediate structure 12 by exposure to water. Water exposure may be accomplished by spraying the 3D intermediate structure 12 with water using wet extraction tool(s) 32, such as a hose and a sprayer, a spray gun, etc. Water exposure may also be accomplished by sonicating the intermediate structure 12 in a water bath. Water exposure may also be accomplished by soaking the intermediate structure 12 in water. In some examples, the water may be heated (e.g., to a temperature ranging from about 22° C. to about 80° C.

In some examples, dry extraction of non-patterned metal build material 14 from the intermediate structure 12 may be used in place of wet extraction. Vibratory or compressive forces may be applied to the metal build material 14 to facilitate breaking apart of any caked up non-patterned metal build material 14. Any other non-patterned metal build material 14 that remain bound to the intermediate structure 12 may be removed by light bead blasting or cleaning with a brush and/or an air jet.

In some examples, the intermediate structure 12 may be cleaned after extraction to remove any remaining non-patterned metal build material 14 from its surface. In an example, cleaning may be performed with a brush and/or an air jet.

Figure 2D:
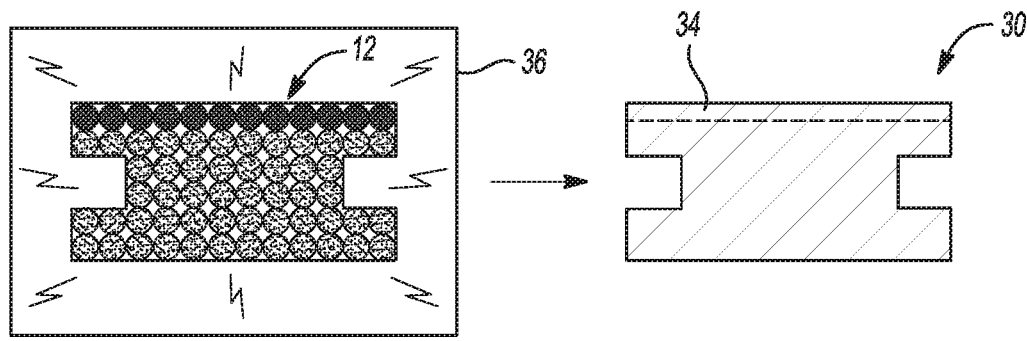

After the extraction and/or the cleaning of the intermediate structure 12, the intermediate structure 12 may be heated to form the sintered 3D object 30 (FIG. 2D). As shown in FIG. 2D, the 3D intermediate structure 12 can be moved to a heating device 36, such as a sintering oven.

In one example, the heating can be at a temperature ranging from about 500° C. to about 3,500° C. At lower temperatures within the range, the network of the polymer particles can thermally degrade, thereby de-binding the 3D intermediate structure 12, and at the higher temperatures within the range, the stainless steel (or other metal) particles are sintered together. In another example, the de-binding and sintering temperatures can be in the range of from about 600° C. to about 1,500° C., or from about 800° C. to about 1,200° C. The de-binding temperature range can vary, depending on the composition of the network (e.g., polymer particles).

The sintering temperature range can vary, depending on the stainless steel or other metal build material that is used. In one example, the sintering temperature can range from about 10° C. below the melting temperature of the metal-based build material to about 50° C. below the melting temperature of the metal-based build material. In another example, the sintering temperature can range from about 100° C. below the melting temperature of the metal-based build material to about 200° C. below the melting temperature of the metal-based build material. The sintering temperature can also depend upon the particle size and period of time that heating occurs, e.g., at a high temperature for a sufficient time to cause particle surfaces to become physically merged or composited together. For example, a sintering temperature for stainless steel can be about 1,400° C. Temperatures outside of these ranges can be used as determined on a case by case basis.

In some examples, the boron-containing hardener may be capable of diffusing at one or more temperatures within the de-binding and sintering temperature range. If it is desirable for the boron-containing hardener to diffuse further into the intermediate structure 12 (and the final 3D object 30), the method 100 may include heating the intermediate structure 12 to a temperature that aids in diffusion of the boron-containing hardener (wherein this temperature is below a sintering temperature of the metal build material 14), holding the intermediate structure 12 at the temperature for a predetermined time; and then heating the intermediate structure 12 to the sintering temperature.

In some examples, the heating device 36 can include an inert atmosphere to avoid oxidation of the metal particles. In one example, the inert atmosphere can be oxygen-free and can include a noble gas, an inert gas, or combination thereof. For example, the inert atmosphere can include a noble gas or an inert gas selected from argon, nitrogen, helium, neon, krypton, xenon, radon, hydrogen, or a combination thereof.

The resulting 3D object 30, as shown in FIG. 2D, has a hardened portion 34. The hardened portion 34 has been boronized, and provides the 3D object 30 surface with enhanced mechanical properties (hardness, wear resistance).

Figure 3A:
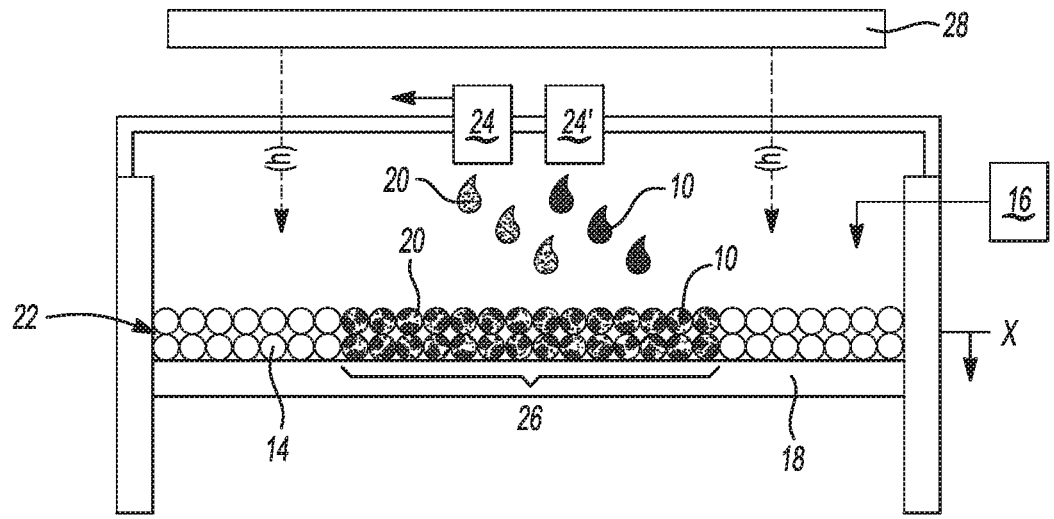
FIGS. 3A and 3B graphically illustrate another example of the method of FIG. 1.
Figure 3B:
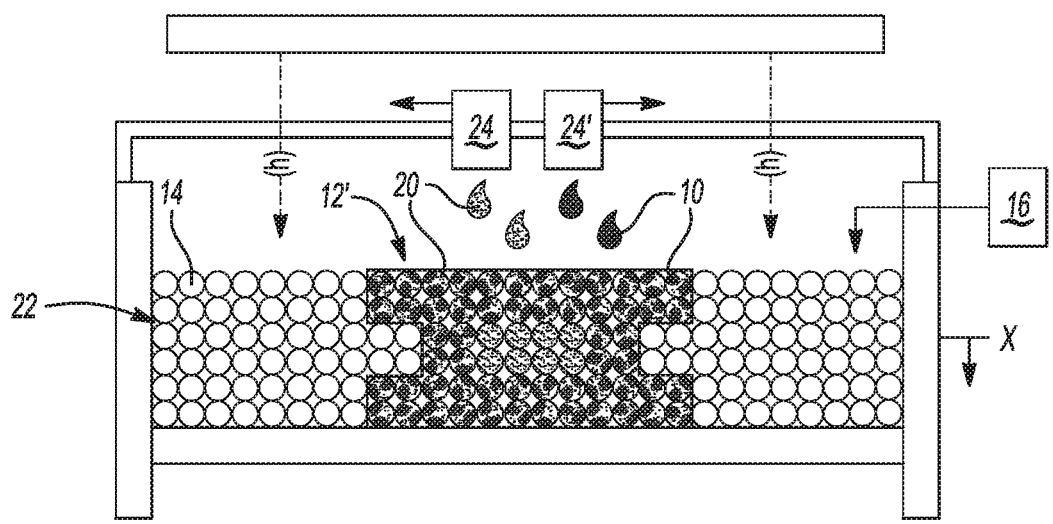

Referring now to FIG. 3A and FIG. 3B, another example of the 3D printing method 100 is depicted where the hardening agent 10 is applied layer-by-layer as the intermediate structure 12' is patterned. The example of the method 100 shown in FIGS. 3A and 3B is similar to the example shown in FIGS. 2A and 2B, except that the hardening agent 10 is selectively applied during the patterning of the intermediate structure 12' rather than after the intermediate structure 12 is patterned and cured. Unlike the example described in reference to FIGS. 2A and 2B, this example of the method 100 is suitable for case-hardening at desirable portions throughout the 3D object that is ultimately formed. In particular, the hardening agent 10 may be applied wherever it is desirable for the 3D object to be case hardened.

As shown in FIG. 3A, one or more portion(s) 26 of one individual build material layer(s) 12 is/are patterned with both the binder fluid 20 and the hardening agent 10. The fluid 20 and agent 10 may be applied sequentially in the same pass of the fluid ejectors 24, 24' or in separate passes of the fluid ejectors 24, 24'. If desirable, other portions 26 may be patterned with the binder fluid 20 but not with the hardening agent 10.

In this example, another build material layer 22 may be applied on the previously patterned layer. The processes of patterning with the binder fluid 20 and (where desirable) the hardening agent 10, may be repeated with this additional build material layer. Patterning may be repeated for each layer that is to be included in the intermediate structure 12.

Heating (h) may be used to remove water from the binder fluid 20 throughout the patterning process.

After all of the layers 22 are patterned with the binder fluid 20 and (where desirable) the hardening agent 10, the intermediate structure 12' is formed, as shown in FIG. 3B. In the example shown in FIG. 3B, the outermost layers and regions of the patterned portion 26 are patterned with both the binder fluid 20 and the hardening agent 10, and the middle region of the patterned portion 26 is patterned with the binder fluid 20 alone. This type of pattern provides the exterior of the 3D object with the case hardened portion. The fluids 20, 10 may be dispensed in any suitable pattern, and in some instances, the hardening agent 10 is applied wherever the binder fluid 20 is applied. The intermediate structure 12' may then be exposed to heat to cure the (latex) polymer particles from the binder fluid 20 in the patterned portion(s) 26. This heating is performed at a temperature ranging from about 120° C. to about 200° C. This heating process forms the strong polymer film throughout the intermediate structure 12', and any non-patterned metal build material 14 surrounding the 3D intermediate structure 12' remains non-cured.

The 3D intermediate structure 12' may be extracted as described in reference to FIG. 2C, and exposed to higher temperatures (e.g., de-binding and sintering) as described in reference to FIG. 2D to form the final 3D object having case-hardened portions throughout its three-dimensional structure. This is unlike the 3D object 30 shown in FIG. 2D, which has a case-hardened surface 34.

The example of the method 100 shown in FIGS. 3A and 3B may be desirable because it enables the ability to tailor the concentration of the boron-containing hardener for each layer 22 and to apply the boron-containing hardener in particular portion(s) of individual layer(s) 22. The layer-by-layer process may be particularly suitable for hardening out-of-plane surfaces (such as the vertical surfaces of a gear tooth) in a straightforward manner.

The layer-by-layer process may also be suitable for forming a reinforcement structure throughout a portion of the 3D object. A reinforcement structure is a portion of a 3D object that had been patterned with both the binder fluid 20 and the hardening agent 10. The pattern of the reinforcement structure is such that it increases the mechanical strength of the 3D object without the hardening agent 10 having to be applied throughout the entire 3D object. Some examples of suitable reinforcement structures 38A, 38B, 38C are shown in FIGS. 4A, 4B, and 4C.

Figure 4A:
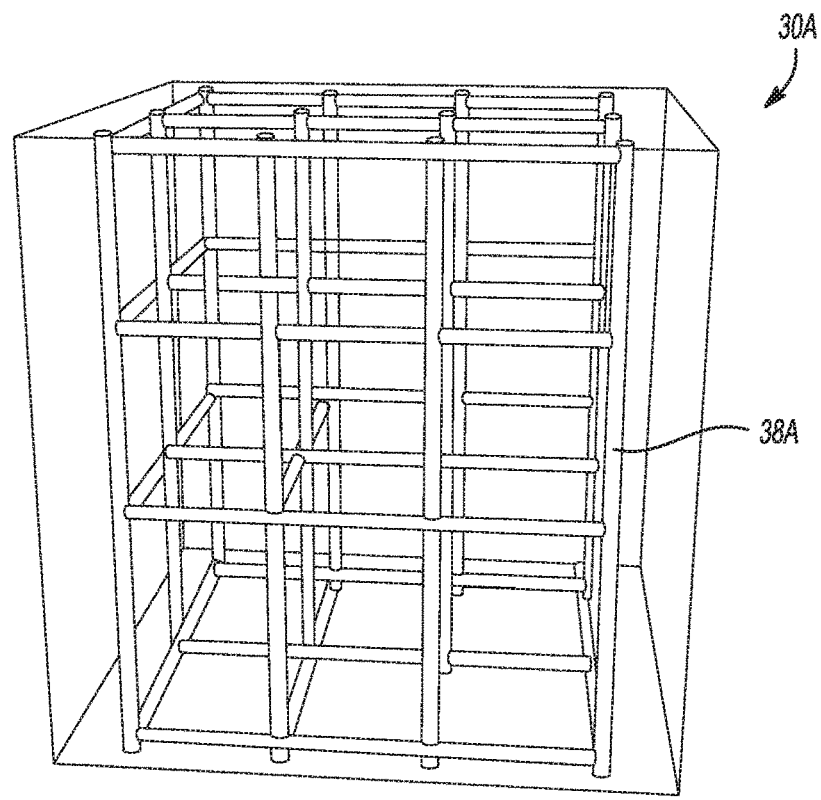
FIGS. 4A through 4C are schematic and perspective views of cube shaped 3D objects including different examples of a boron-containing reinforcement structure therein.

In the example 3D object 30A shown in FIG. 4A, the reinforcement structure 38A is a lattice. This reinforcement structure 38A can be created by depositing the hardening agent 10 in a lattice pattern throughout the layers 22. In this example, the layers 22 are also patterned with the binder agent 20 in a cubed pattern.

Figure 4B:
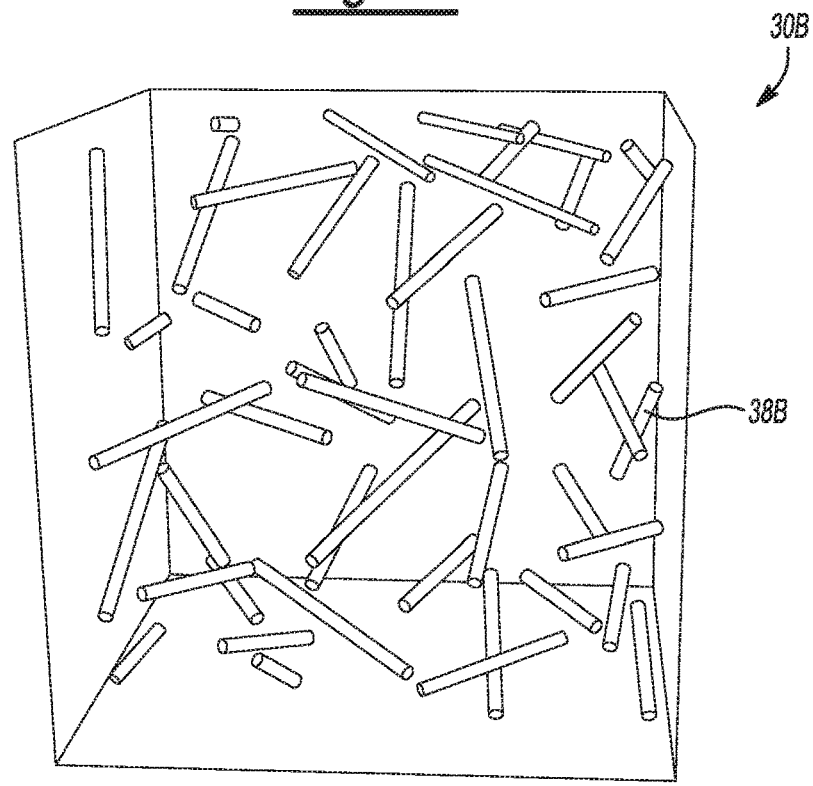

In the example 3D object 30B shown in FIG. 4B, the reinforcement structure 38B is an anisotropic lattice. This reinforcement structure 38B can be created by depositing the hardening agent 10 in an anisotropic lattice pattern throughout the layers 22. In this example, the layers 22 are also patterned with the binder agent 20 in a cubed pattern.

Figure 4C:
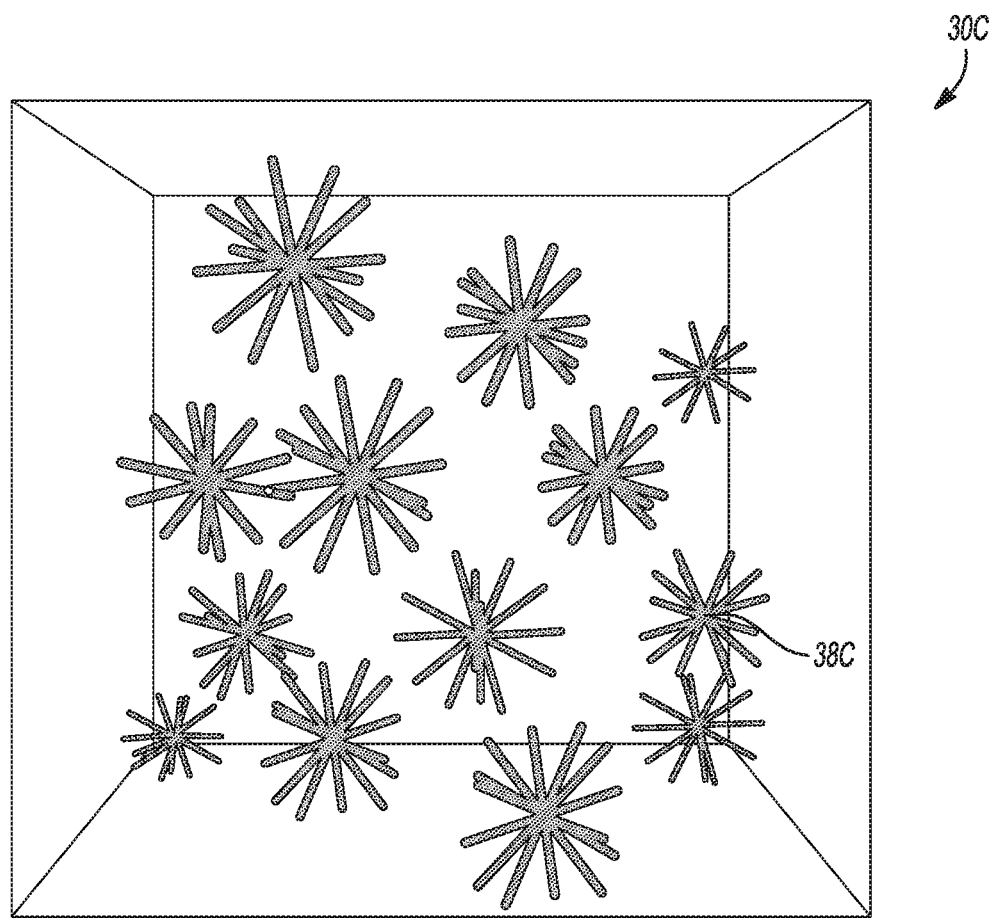

In the example 3D object 30C shown in FIG. 4C, the reinforcement structure 38C includes multiple starburst shaped objects. This reinforcement structure 38C can be created by depositing the hardening agent 10 in individual starburst patterns throughout the layers 22. In this example, the layers 22 are also patterned with the binder agent 20 in a cubed pattern.

Still further, layer-by-layer patterning with the hardening agent 10 enables one to create a gradient in the hardness profile through the 3D object 30. In this example, the method 100 includes varying an amount of the hardening agent 10 that is applied to create a gradient profile of the boron-containing hardener throughout a predetermined depth of the intermediate structure 12, and ultimately the 3D object that is formed. In one example of the layer-by-layer process, several layers 22 are patterned with the binder fluid 20, and then the outermost layers (e.g., the last 3-10 layers) are patterned with both the hardening agent 10 and the binder fluid 30. The amount of the hardening agent 10 may be varied throughout the outermost layers to form the gradient.

It is to be understood that the ranges provided herein include the stated range and any value or sub-range within the stated range, as if such values or sub-ranges were explicitly recited. For example, from about 0.5 wt % to about 2 wt % should be interpreted to include not only the explicitly recited limits of from about 0.5 wt % to about 2 wt %, but also to include individual values, such as about 0.85 wt %, about 1.9 wt %, etc., and sub-ranges, such as from about 0.9 wt % to about 1.5 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A hardening agent for three-dimensional printing, comprising:
   a water dispersible boron-containing hardener selected from the group consisting of boron carbide, boron nitride, a silicon boride, an aluminum boride, an alkali metal boride, an alkaline earth metal boride, a transition metal boride, a lanthanide boride, and combinations thereof, wherein the water dispersible boron-containing hardener present in an amount ranging from about 6 wt % to about 15 wt %, and wherein the water dispersible boron-containing hardener has an average particle size ranging from about 2 nm to about 100 nm; and
   a jettable liquid vehicle;
   wherein the hardening agent is devoid of a pigment and a dye.

2. The hardening agent as defined in claim 1, further comprising a polymeric dispersant.

3. The hardening agent as defined in claim 1, wherein the jettable liquid vehicle includes water, a co-solvent, and surfactant.

4. A multi-fluid kit, comprising:
   a binder agent; and
   a hardening agent including:
      a water dispersible boron-containing hardener present in an amount ranging from about 6 wt % to about 15 wt %, wherein the water dispersible boron-containing hardener is selected from the group consisting of boron carbide, boron nitride, silicon borides, aluminum borides, alkali metal borides, alkaline earth metal borides, transition metal borides, lanthanide borides, and combinations thereof, and wherein the water dispersible boron-containing hardener has an average particle size ranging from about 2 nm to about 100 nm; and
      a jettable liquid vehicle;
      wherein the hardening agent is devoid of a pigment and a dye.

5. The multi-fluid kit as defined in claim 4, wherein the hardening agent further comprises a polymeric dispersant.

6. The hardening agent as defined in claim 1, wherein the water dispersible boron-containing hardener is the silicon boride, and the silicon boride is selected from the group consisting of silicon triboride ($SiB_3$), silicon tetraboride ($SiB_4$), silicon hexaboride ($SiB_6$), or $SiB_n$, where n=14, 15, 40.

7. The hardening agent as defined in claim 1, wherein the water dispersible boron-containing hardener is the aluminum boride, and the aluminum boride is selected from the group consisting of $AlB_2$ and $AlB_{12}$.

8. The hardening agent as defined in claim 1, wherein the water dispersible boron-containing hardener is the alkali metal boride or the alkaline earth metal boride, and the alkali metal boride or the alkaline earth metal boride is selected from the group consisting of $LiB_6$, $NaB_6$, $KB_6$, $MgB_2$, $MgB_4$, $CaB_4$, $CaB_6$, $SrB_6$, and $BaB_6$.

9. The hardening agent as defined in claim 1, wherein the water dispersible boron-containing hardener is the transition metal boride or the lanthanide boride, and the transition metal boride or the lanthanide boride is selected from the group consisting of TiB, VB, CrB, MnB, FeB, CoB, NiB, $ZrB_2$, NbB, MoB, $MoB_2$, WB, $WB_2$, $LaB_4$, $LaB_6$, $NdB_4$, $NdB_6$, $SmB_4$, and $SmB_6$.

10. The hardening agent as defined in claim 2, wherein the polymeric dispersant is present in the hardening agent in an amount ranging from about 0.1 wt % active to about 5 wt % active based on a total weight of the hardening agent.

11. The hardening agent as defined in claim 3, wherein the jettable liquid vehicle further includes an anti-microbial agent, a chelating agent, or combinations thereof.

\* \* \* \* \*